United States Patent [19]

Parton et al.

[11] Patent Number: 4,871,656
[45] Date of Patent: Oct. 3, 1989

[54] PHOTOGRAPHIC SILVER HALIDE ELEMENTS CONTAINING INFRARED FILTER DYES

[75] Inventors: Richard L. Parton, Webster; Anthony D. Gingello, Rochester; David J. Collett, Walworth; David A. Stegman, Churchville; Anthony Adin, Rochester, all of N.Y.

[73] Assignee: Eastman Kodak Company, Rochester, N.Y.

[21] Appl. No.: 166,134

[22] Filed: Mar. 10, 1988

Related U.S. Application Data

[63] Continuation-in-part of Ser. No. 41,955, Apr. 24, 1987.

[51] Int. Cl.$^4$ .............................. G03C 1/84
[52] U.S. Cl. ............................ 430/522; 430/512; 430/517; 430/592; 548/411; 548/426; 548/424; 548/509
[58] Field of Search .......... 430/512, 517, 522, 592; 548/411, 424, 426, 599

[56] References Cited

U.S. PATENT DOCUMENTS

| | | | |
|---|---|---|---|
| 3,482,978 | 12/1969 | Fumia et al. | 96/84 |
| 3,482,978 | 12/1969 | Fumia et al. | 96/84 |
| 3,615,544 | 10/1971 | Amana et al. | 430/629 |
| 3,865,817 | 2/1975 | Kobayashi et al. | 430/522 |
| 4,362,800 | 12/1982 | Takinoto et al. | 430/83 |
| 4,581,325 | 4/1986 | Kitchin et al. | 430/522 |

FOREIGN PATENT DOCUMENTS

37-123454 6/1962 Japan .

OTHER PUBLICATIONS

C.A. 11B46u, Chemical Abstract vol. 66, 1967 p. 1172, 9MITH.

*Primary Examiner*—Jack P. Brammer
*Attorney, Agent, or Firm*—Paul L. Marshall

[57] ABSTRACT

A dye useful for absorbing infrared radiation in photographic elements, having the structure:

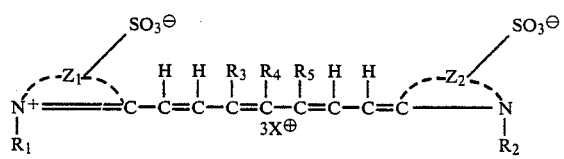

is disclosed.

In this formula, $R_1$ and $R_2$ each independently represents sulfoalkyl, carboxyalkyl, or sulfatoalkyl, from 2 to 4 carbon atoms, having 2 carbon atoms in the alkyl chain linking the nitrogen atom of each Z ring and the sulfo or sulfato group, and 1 carbon atom in the alkyl chain linking the nitrogen atom of each Z ring and the carboxy group.

$R_3$ and $R_5$ are each hydrogen or together represent the atoms necessary to complete a 5- or 6-membered carbocyclic ring, and $R_4$ represents hydrogen, alkyl of 1 to 4 carbon atoms, halogen, cyano, or

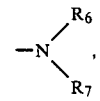

where $R_6$ and $R_7$ each independently represents alkyl of from 1 to 6 carbon atoms or aryl or together represent the non-metallic atoms necessary to form a 5- or 6-membered heterocyclic ring.

$X^\oplus$ represents a cation.

$Z_1$ and $Z_2$ each independently represent the atoms needed to complete an indole, naphthindole or benzindole nucleus.

6 Claims, No Drawings

PHOTOGRAPHIC SILVER HALIDE ELEMENTS CONTAINING INFRARED FILTER DYES

This is a continuation-in-part of earlier filed application Ser. No. 041,955, filed on Apr. 24, 1987, now abandoned.

FIELD OF THE INVENTION

The present invention relates to infrared absorbing dyes and photographic elements comprising a layer containing such dyes.

BACKGROUND OF THE INVENTION

Photographic elements having layers comprising filter dyes are known. These filter dyes may be used for a variety of purposes, such as absorber dyes in photographic emulsion layers to improve the image sharpness of that layer, general purpose filter dyes for absorbing light of a particular wavelength so it does not expose or exposes at a reduced intensity a lower layer in the element, or as antihalation dyes to reduce halation in the image-forming layers.

Filter dyes may be present in essentially any layer of a photographic element where it is desired to absorb radiation in the region of the spectrum where the dye absorbs light, such as an interlayer, a radiation-sensitive layer, an overcoat layer, an undercoat layer, a backing layer, or others known in the art. Absorber dyes (also called intergrain absorber dyes) are generally present in the radiation-sensitive layers of photographic elements. Antihalation layers may be located on either side of a transparent support carrying radiation sensitive layers, particularly silver halide emulsion layers. Moreover, such antihalation layers may be coated between two or more silver halide emulsion layers in a multilayer element or as a backing layer on the side of the support away from the light sensitive layers.

The development of information recording equipment using semiconductor laser diodes emitting in the infrared spectral region has required a parallel development of photographic elements, particularly silver halide photographic elements, with appropriate spectral sensitivity. Such elements often require the presence of filter dyes that absorb infrared radiation in one or more layers of the element, for example, as antihalation dyes or absorber dyes.

Such filter dyes should:

(1) filter light in the region from about 730 nm to about 900 nm, depending on the emission wavelength of the laser diode (a common laser emission wavelength is about 800 nm and other typical laser emission wavelengths are about 750, 780, 820, and 870 nm), (2) be water soluble at levels of at least 5 mg/ml so as to allow aqueous dissolution of the dye and provide compatibility with hydrophilic layers, and (3) leave little or no stain in the processed film.

U.S. Pat. No. 4,362,800 discloses 1,1,1'1'-tetramethyl-3,3'-bis(sulfoalkyl)-1H-benz[e]indolotricarbocyanine sodium salt. This dye has been used with some success as a photographic filter dye, but it tends to leave a greenish stain after processing. Such a stain is objectionable. Other dyes, such as those disclosed in U.S. application Ser. No. 881,312, entitled Novel Infrared Absorbing Dyes and Photographic Elements Containing Same, filed July 2, 1986, require the use of a deaggregant to obtain the proper absorption wavelength. Deaggregants, however, can cause adverse photographic effects, such as speed loss. Thus, a nonstaining infrared filter dye is needed.

SUMMARY OF THE INVENTION

The present invention provides infrared-absorbing filter dyes having the formula:

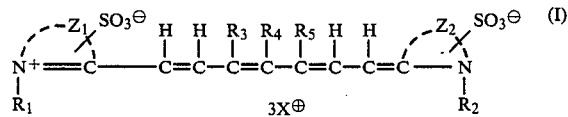

In this formula, $R_1$ and $R_2$ each independently represent sulfoalkyl, carboxyalkyl, or sulfatoalkyl, from 2 to 4 carbon atoms, having 2 carbon atoms in the alkyl chain linking the nitrogen atom of each Z ring and the sulfo or sulfato group, and 1 carbon atom in the alkyl chain linking the nitrogen atom of each Z ring and the carboxy group.

$R_3$ and $R_5$ are each hydrogen or together represent the atoms necessary to complete 5- or 6-membered carbocyclic ring, and $R_4$ represents hydrogen, alkyl of 1 to 4 carbon atoms, aryl, halogen, cyano, or

where $R_6$ and $R_7$ each independently represents alkyl of from 1 to 6 carbon atoms or aryl or together represent the non-metallic atoms necessary to form a 5- or 6-membered heterocyclic ring.

$X^\oplus$ represents a cation.

$Z_1$ and $Z_2$, each independently represent the atoms needed to complete an unsubstituted or a lower alkyl substituted indole, naphthindole or benzindole nucleus.

Such dyes can be used effectively as filter dyes in infrared-sensitive photographic elements without requiring a deaggregant and without leaving an objectionable post-processing stain.

DESCRIPTION OF THE PREFERRED EMBODIMENTS

Dyes of the invention are those of formula (I). With such dyes according to formula (I), $R_1$ and $R_2$ each independently represent sulfoalkyl, carboxyalkyl, or sulfatoalkyl of from 2 to 4 carbon atoms, having 2 carbon atoms in the alkyl chain linking the nitrogen atom of each Z ring and the sulfo or sulfato group, and 1 carbon atom in the alkyl chain linking the nitrogen atom of each Z ring and the carboxy group. Additionally, substituted sulfoalkyl, carboxyalkyl, and sulfatoalkyl are useful as $R_1$ and $R_2$. Such groups may be substituted with substituents such as methyl, hydroxy, and halogen such as Cl or F. Examples of $R_1$ and $R_2$ include sulfoethyl, carboxymethyl, and 2-sulfopropyl.

$R_3$ and $R_5$ each independently represent hydrogen or together represent the atoms necessary to complete a 5- or 6-membered carbocyclic ring, such as cyclopentenyl or cyclohexenyl. Substituted carbocyclic rings (substituted with, for example, alkyl such as methyl, ethyl, propyl, and butyl, halogen, or hydroxy) are also useful as $R_3$ and $R_5$ (e.g., 5-hydroxycyclohexenyl or 5,5'-dimethylcyclohexenyl).

$R_4$ represents hydrogen, alkyl of from 1 to 4 carbon atoms such as methyl, ethyl, or propyl, halogen such as F, Cl, etc., cyano, or hydroxy, alkyl (e.g., methyl), hydroxyalkyl such as hydroxymethyl, carboxyalkyl such as carboxymethyl, or aryl (e.g., phenyl or p-sulfophenyl) are also useful as $Z_1$ and $Z_2$ according to the present invention.

A preferred class of dye compounds according to formula (I) are represented by formula:

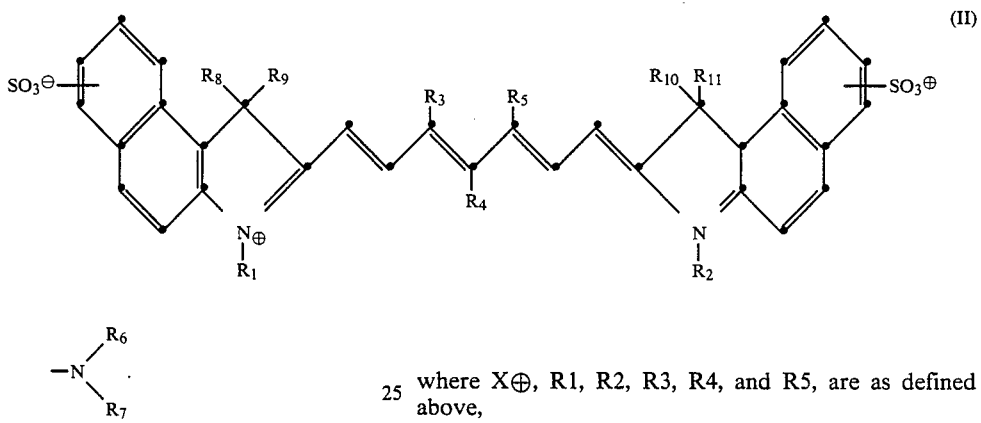

(II)

where $X^\oplus$, $R_1$, $R_2$, $R_3$, $R_4$, and $R_5$, are as defined above, $R_8$, $R_9$, $R_{10}$ and $R_{11}$ each independently represent methyl or ethyl, or $R_8$ and $R_9$ or $R_{10}$ and $R_{11}$, taken together with the carbon atoms to which they are attached, may form a cycloalkyl group. Also useful as $R_8$, $R_9$, $R_{10}$, and $R_{11}$ include groups substituted with substituents such as hydroxy, sulfato, and carboxy. Examples of useful substituted groups include hydroxymethyl, sulfatomethyl, and carboxyethyl.

The dyes of this invention can be made according to the procedures of U.S. Pat. Nos. 2,895,955, 3,148,187, and 3,423,207. Such a preparation procedure is illustrated in Example 1 infra.

A deaggregant is not needed or even necessarily desirable for the dyes of this invention. The dyes of the invention have an absorbance maxium in the desired wavelength range in molecular form and do no aggregate. These dyes avoid the necessity of using a deaggregant, which can cause adverse photographic effects such as speed loss during storage.

Examples of dyes of the invention include

Substituted alkyl (substituted with, for example, hydroxy, halogen such as Cl or F, or aryl such as phenyl) are also useful as $R_4$ (e.g., hydroxymethyl, phenoxymethyl, or phenylmethyl). $R_6$ and $R_7$ each individually represent alkyl of from 1 to 6 carbon atoms (e.g., methyl, ethyl, propyl), aryl (e.g., phenyl, p-methoxyphenyl), or together represent the non-metalic atoms necessary to complete a 5- or 6-membered heterocyclic ring. Examples of such heterocyclic ring groups include morpholino, thiomorpholino, and piperazino, such as 4-ethoxycarbonyl-1-piperazino and 4-methyl-1-piperazino. Additionally, substituted alkyl, aryl, or heterocyclic rings are useful as $R_6$ and $R_7$. Useful substituents include hydroxy, alkoxy, halogen, acetyl, carboxy, or sulfo, and useful substituted groups include hydroxyethyl, 4-chlorophenyl, 4-methoxyphenyl, 4-sulfophenyl, and 2-carboxyethyl.

It is contemplated herein that indole, naphthindole, or benzindole nuclei that are substituted with substituents such as halogen (e.g., Cl or F), sulfo, carboxy,

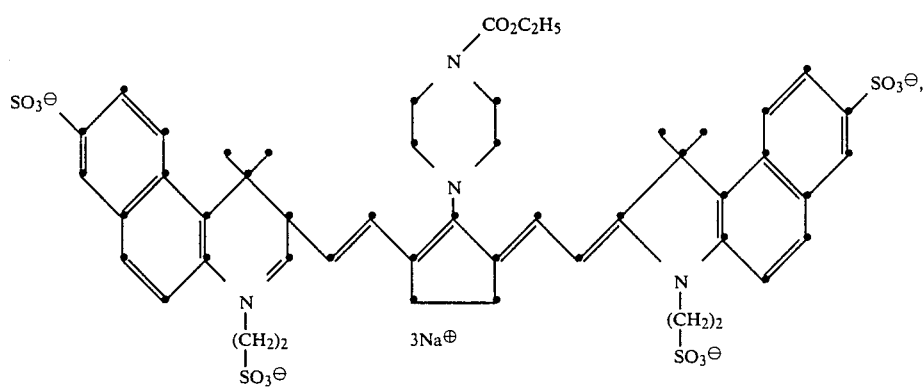

and

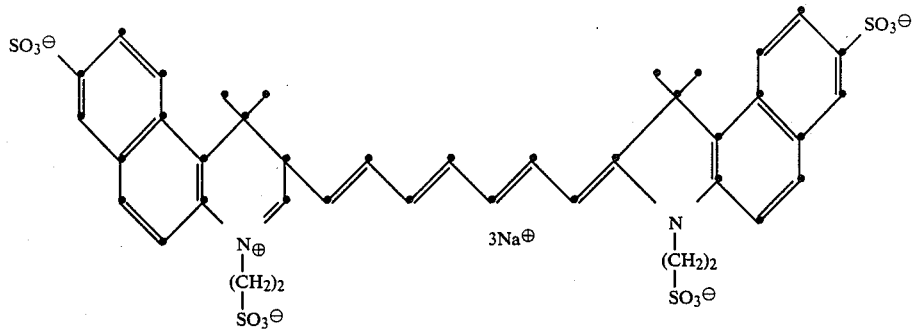

20

The dyes of formula (I) can be incorporated in a photographic element in any amount known to be effective as a filter dye in photographic elements. In a preferred embodiment, the dyes of the invention are in a hydrophilic colloid layer of a photographic element at a concentration of from 0.1 to 500 mg/ft$^2$. The deaggregant is preferably present in an amount of from 25 to 10,000 weight percent, based on the weight of the dye.

When used as an antihalation dye, the dye of formula (I) is preferably present in a layer at a level of from 1 to 500 mg/ft$^2$ and more preferably from 5 to 100 mg/ft$^2$. Antihalation layers are prepared by coating on the photographic element or on its support, by methods well-known in the art, a water solution of the dye, the deaggregant, a hydrophilic colloid binder and a coating aid such as saponin.

When used as an absorber dye in a photosensitive layer of a photographic element, the dye of formula (I) is preferably present at a level of from 0.1 to 50 mg/ft$^2$ and more preferablyl from 0.3 to 20 mg/ft$^2$. Such layers are prepared by coating on the photographic element or on its support, by methods well-known in the art, an emulsion of silver halide grains, a hydrophilic colloid binder, and the dye, as well as other addenda known to be included in photosensitive layers, such as sensitizing dyes (e.g., infrared-sensitizing dyes), dye-forming image couplers, and the like.

For many purposes, it is desirable to add agents to harden the colloidal binder material so that the filter dye-containing layer remains intact in the photographic element during and following the processing operation. The pH of the coating solution is adjusted when necessary by the usual methods to a level that is compatible with the light-sensitive emulsion layer.

The proportions of dye, deaggregant, water-permeable hydrophilic colloid binder, hardener, silver halide (if present), sensitizing dye (if present), and coating aid used in making layers containing the filter dye of formula (I) may be varied over wide ranges and will depend upon the specific requirements of the photographic element being produced. The method used to determine the optimum composition is well known in the art and need not be described here.

The photographic elements may be coated on any suitable support material used in photography such as polyethylene terephthalate, cellulose nitrate, cellulose acetate, papers, etc.

Hydrophilic colloidal materials used as binders include gelatin, gelatin substitutes,collodion, gum arabic, cellulose ester derivatives such as alkyl esters of carboxylated cellulose, hydroxy ethyl cellulose, carboxy methyl hydroxy ethyl cellulose, synthetic resins, such as the amphoteric copolymers described by Clavier et al, in U.S. Pat. No. 2,949,442, issued Aug. 16, 1960, polyvinyl alcohol, and others well known in the art.

Examples of polymeric gelatin substitutes are copolymers of allylamine and methacrylic acid, copolymers of allylamine, acrylic acid and acrylamide, hydrolyzed copolymers of allylamine, methacrylic acid and vinyl acetate, the copolymers of allylamine, acrylic acid and styrene, the copolymers of allylamine, methacrylic acid and acrylonitrile, etc.

The dye and the deaggregant are generally added to the water-permeable colloidal binder in water or methanol solution. Usually a coating aid, such as saponin, is added to the dyed colloidal suspension before coating it as a layer on the photographic element.

The photographic elements utilizing the filter dyes of formula (I) have infrared light-sensitive emulsion layers. Such layers may contain silver chloride, silver bromide, silver chlorobromide, silver iodide, silver bromoiodide, silver chlorobromoiodide, etc., as the light-sensitive material. Indeed, any infrared absorbing light-sensitive silver halide emulsion layer may be used in these photographic elements. The silver halide emulsion are sensitized for infrared absorption by any of the sensitizers commonly used to produce the desired sensitometric characteristics.

Methods of making such elements, the means for sensitizing them to infrared radiation and the incorporation of filter dyes in silver halide emulsion layers or antihalation layers are well known and need not be described herein. Detailed teachings in this regard can be obtained from Research Disclosure, 1978, Item 17643 entitled "Photographic Silver Halide Emulsions, Preparations, Addenda, Processing and Systems."

The practice of the invention is further illustrated by the following examples. The structures of the dyes of the Examples are given in the Tables I, II, and III.

TABLE I

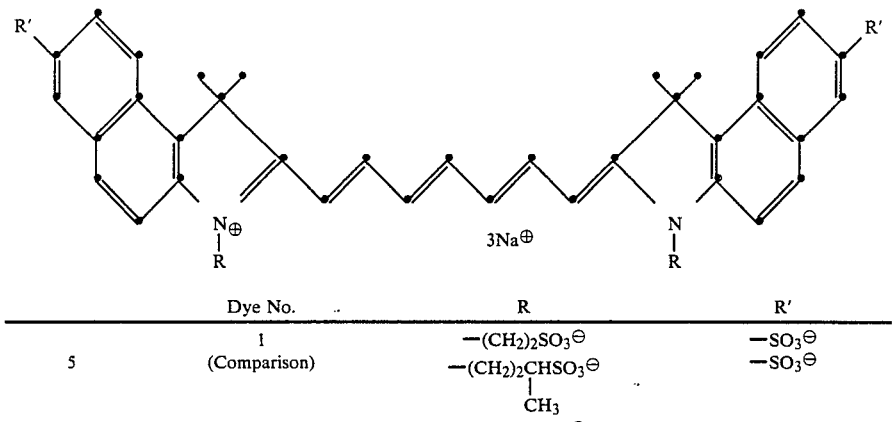

| Dye No. | | R | R' |
|---|---|---|---|
| | 1 | $-(CH_2)_2SO_3^\ominus$ | $-SO_3^\ominus$ |
| 5 | (Comparison) | $-(CH_2)_2CHSO_3^\ominus$<br>$\quad\quad\quad\;\;\mid$<br>$\quad\quad\quad\;\;CH_3$ | $-SO_3^\ominus$ |
| 6 | (Comparison) | $-(CH_2)_3SO_3^\ominus$ | H |
| 7 | (Comparison) | $-(CH_2)_4SO_3^\ominus$ | H |
| 8 | (Comparison) | $-(CH_2)_2CHSO_3^\ominus$<br>$\quad\quad\quad\;\;\mid$<br>$\quad\quad\quad\;\;CH_3$ | H |

TABLE II

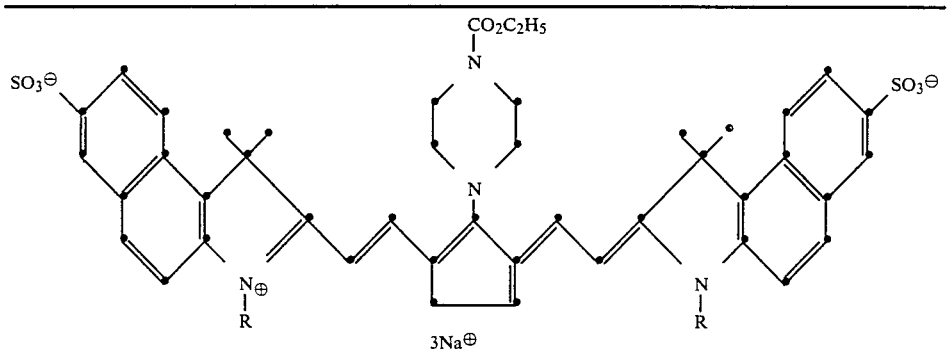

| Dye No. | | R |
|---|---|---|
| | 2 | $-(CH_2)_2SO_3^\ominus$ |
| 9 | (Comparison) | $-(CH_2)_2CHSO_3^\ominus$<br>$\quad\quad\quad\;\;\mid$<br>$\quad\quad\quad\;\;CH_3$ |

TABLE III

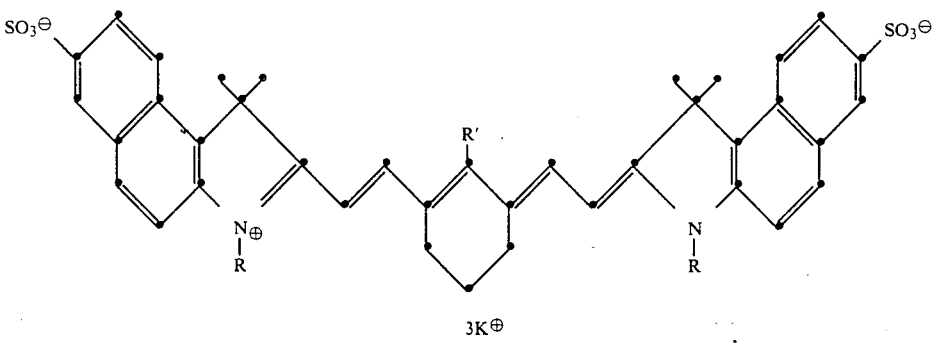

| Dye No. | | R | R' |
|---|---|---|---|
| | 3 | $-(CH_2)_2SO_3$ | Cl |
| | 4 | $-(CH_2)_2SO_3^\ominus$ | $CH_3$ |
| 10 | (Comparison) | $-(CH_2)_2CHSO_3^\ominus$<br>$\quad\quad\quad\;\;\mid$<br>$\quad\quad\quad\;\;CH_3$ | $-CH_3$ |

EXAMPLE 1

Preparation of Dye 1

Step 1—Preparation of 7-sulfo-1,1,2-trimethyl-1H-benz[e]indole sodium salt (Intermediate A)

1,1,2-Trimethyl-1H-benz[e]indole (100 g) was added with stirring to 500 ml of concentrated $H_2SO_4$. The mixture was heated at 180° C. for ½ hour, cooled to 6-°C., and poured onto 2 kg ice. 500 ml of 50% aqueous NaOH was added slowly. After 24 hours at room temperature, the solid precipitate that had formed was filtered off and the filtrate was mixed with 500 ml saturated aqueous $Na_2SO_4$. The resulting precipitate was collected, added to the previously filtered solid precipitate, and recrystallized from 2 l of $H_2O$. This recrystallized material (25 g) was dried overnight under vacuum at 50° C. Purity was determined by nuclear magnetic resonance. This material was converted to the sodium salt by dissolving it in water, adding 1 equivalent of sodium bicarbonate, and evaporating the water.

Step 2—Preparation of anhydro-7-sulfo-3-(2-sulfoethyl)-1,1,2-trimethyl-1H-benz[e]-indolinium hydroxide sodium salt (Intermediate B)

A mixture of 9.3 g intermediate A and 5.3 g 2-chloroethanesulfonyl chloride in 100 ml of acetic acid were refluxed for 2 hours. After cooling to room temperature, the solvent was removed under vacuum and 100 ml of ethanol was added. The solid was collected and dried to yield a compound that was confirmed to be intermediate B by NMR spectrum.

Step 4—Preparation of anhydro-3,3'-di-(2-sulfoethyl)-7,7'-disulfo-1,1,1',1'-tetramethylbenz[e]indolotricarbocyanine hydroxide trisodium salt (dye 1 of Table I)

2.0 g of intermediate B and 0.6 g glutacondialdehyde dianil hydrochloride were combined in 15 ml of acetic anhydride with 3 ml of triethylamine. The mixture was heated at reflux for 4 minutes. The solid formed was collected and washed with acetic anhydride, and then dissolved in a 50/50 mixture of methanol and water with heating. The solution was filtered and excess sodium acetate was added to the filtrate. After cooling, the solid was filtered out of the solution, washed with methanol, and dried. This material was dye 1 of Table I, λ-max=784 nm in methanol, $\epsilon$-max=22.34×$10^4$.

EXAMPLE 2

Preparation of anhydro-13-(4-ethoxycarbonyl-1-piperazinyl)-12,14-ethylene-3,3'-di-(2-sulfoethyl)-7,7'-disulfo-1,1,1',1'-tetramethylbenz[e]indolotricarbocyanine hydroxide trisodium salt (dye 2 of Table II)

2.1 g of intermediate B from Example 1 and 1.3 g 1-[2,5-bis(anilinomethylene)cyclopentylidene]-4-ethoxycarbonylpiperazinium tetrafluoroborate were combined in 10 ml N-methylpyrrolidinone and 4 ml triethylamine and heated at 200° C. for 15 minutes. After cooling to room temperature, ether was added with stirring. The ether phase was then decanted and the product was dissolved in methanol and heated to reflux. Excess sodium acetate was added and the mixture was cooled to room temperature. The solid was collected and recrystallized from a 50/50 mixture of methanol and water to yield dye 2 of Table II, λ-max=726 nm in methanol, $\epsilon$-max=13.01×$10^4$.

EXAMPLE 3

This example illustrates the desirable adsorption but severe post processing stain problem of comparison dyes having structures similar to the dyes of this invention (comparison dyes 6, 7, 8, and 9), the undesirable absorption of dyes 5 and 10, and the desired absorption and low residual stain of dyes 1–4 of this invention.

Coating compositions of this example were prepared by adding the components, at predetermined levels based on the coverages desired in coated layers of the composition, to a hydrophilic material such as gelatin. In these examples the compositions were coated on a polyethylene terephthalate support to achieve gelatin coverage of 3.14 g/$m^2$ and component coverage as listed in Table IV. Absorption spectra were obtained using a Diano Match Scan II Spectrophotometer before and after processing.

Processing was by the rack and tank method with development for 30 s at 38° C. in Kodak Rapid Scanner Developer, fixing at 38° C. in Kodak Rapid Fixer and washing for 60 s at about 32° C. Total transmittance density measurements were made before and after processing to indicate stain levels before and after processing. A visual evaluation was also made of the post-process stain. The results are listed in Table IV. In correlating the visual evaluation of stain with observed spectral curves it should be noted that the eye is sensitive to about 750 nm.

Comparison Dyes 6-9 show strong absorption in the spectral region of interest. However, they also show severe post-processing stain. Comparison dyes 5 and 10 show some absorption in the 800 nm range, but they have an aggregate peak beyond 900 nm, rendering them unsuitable as infared absorbing antihalation dyes.

In Table IV, coatings 7–10 contain dye compositions of the invention. Coatings 1, 2, 3, 4, 5, and 6 contain dyes 5, 6, 7, 8, 9, and 10, respectively, identified in Tables I-III as comparison dyes.

In Table IV, the stain evaluation, done visually, is recorded using the code VS=very severe, S=severe, M=moderate, SL=slight and BD=barely detectable. Other symbols include * which indicates that the dye in this coating had an aggregate peak beyond 900 nm. The optical density (OD) of the aggregate peak is much higher than the maximum in the table. λ-max is the peak with the highest OD in the 300 to 900 nm region λ-sec indicates a secondary maximum or, in most cases, a shoulder (labeled s) or slight curve inflection (labeled i).

TABLE IV

| Coating No. | Dye | Level g/$m^2$ | Unprocessed λ-max | OD | λ-sec | OD | Processed λ-max | OD | λ-sec | OD | Stain |
|---|---|---|---|---|---|---|---|---|---|---|---|
| 1 | 5 | 0.043 | 805* | 0.350 | 750i | 0.210 | 815 | 0.092 | 730i | 0.057 | M |
| 2 | 6 | 0.029 | 732 | 0.495 | 800 | 0.320 | 732 | 0.380 | 800i | 0.252 | VS |
| 3 | 7 | 0.022 | 802 | 0.390 | 740 | 0.270 | 802 | 0.177 | 740i | 0.125 | S |

TABLE IV-continued

| Coating No. | Dye | Level g/m² | Absorption Data | | | | | | | | Stain |
|---|---|---|---|---|---|---|---|---|---|---|---|
| | | | Unprocessed | | | | Processed | | | | |
| | | | λ-max | OD | λ-sec | OD | λ-max | OD | λ-sec | OD | |
| 4 | 8 | 0.022 | 800 | 0.350 | 735 | 0.290 | 800 | 0.172 | 740s | 0.140 | S |
| 5 | 9 | 0.064 | 815 | 1.081 | — | — | 816 | 1.117 | — | — | S |
| 6 | 10 | 0.064 | 828* | 0.557 | 765i | 0.280 | 823 | 0.263 | 750s | 0.090 | M |
| 7 | 1 | 0.064 | 797 | 1.218 | 730s | 0.675 | 800 | 0.02 | 730 | 0.010 | BD |
| 8 | 2 | 0.064 | 742 | 0.635 | — | — | 737 | 0.06 | — | — | BD |
| 9 | 3 | 0.064 | 834 | 0.788 | 765s | 0.500 | 836 | 0.105 | 765s | 0.040 | M |
| 10 | 4 | 0.064 | 819 | 0.862 | 752s | 0.439 | 820 | 0.060 | 750s | 0.090 | BD |

The invention has been described in detail with particular reference to preferred embodiments thereof, but it will be understood that variations and modifications can be effected within the spirit and scope of the invention.

What is claimed is:

1. A photographic element comprising a support having thereon a hydrophilic colloid layer comprising infrared-sensitive silver halide and a hydrophilic colloid layer, which is the same as or different from said silver halide layer, comprising an amount effective as a photographic filter dye of a compound having the formula:

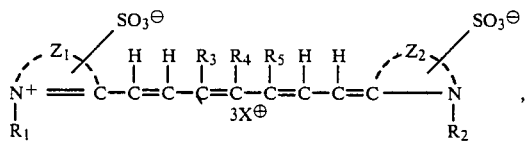

wherein:

$R_1$ and $R_2$ each independently represents sulfoalkyl carboxyalkyl, or sulfatoalkyl containing from 2 to 4 carbon atoms, having 2 carbon atoms in the alkyl chain between the nitrogen atom of each Z ring and the sulfo or sulfato group, and 1 carbon atom in the alkyl chain between the nitrogen of each Z ring and the carboxy group, $R_3$ and $R_5$ are each hydrogen or together represent the atoms necessary to complete a 5- or 6-membered carbocyclic ring, $R_4$ represents hydrogen, alkyl of 1 to 4 carbon atoms, aryl, cyano, halogen, or

where $R_6$ and $R_7$ each independently represents alkyl of from 1 to 6 carbon atoms or aryl or together represent the non-metallic atoms necessary to form a 5- or 6-membered heterocyclic ring, $X^\oplus$ represents a cation, and $Z_1$ and $Z_2$ each independently represents the atoms that complete an indole, naphthindole or benzindole nucleus.

2. A photographic element according to claim 1 wherein wherein the dye is present in an amount of from 0.1 to 500 mg/ft².

3. A photographic element according to claim 1 wherein the layer comprising the dye is substantially free from any deaggregating compound.

4. A photographic element according to any of claims 1-3 wherein the dye has the structure:

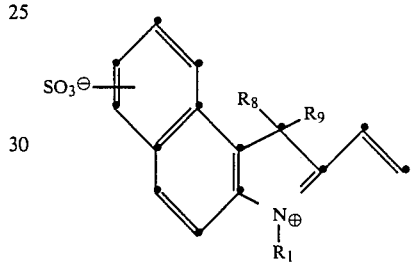

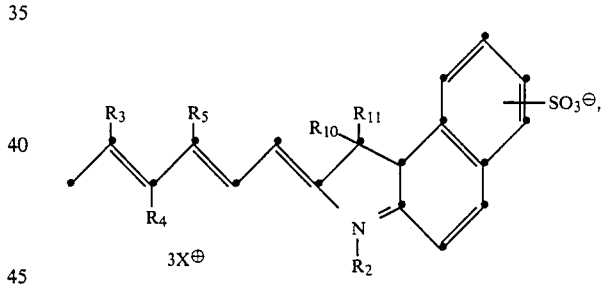

wherein $X^\oplus$, R1, R2, R3, R4, and R5, are as defined in claim 1, $R_8$, $R_9$, $R_{10}$, and $R_{11}$ each independently represent methyl or ethyl, or $R_8$ and $R_9$, or $R_{10}$ and $R_{11}$, taken together with the carbon atoms to which that are attached, may form a cycloalkyl group.

5. A photographic element according to claim 4 wherein the dye is in the silver halide layer.

6. A photographic element according to claim 4 wherein the dye is an antihalation dye present in a layer other than the silver halide layer.

* * * * *